United States Patent [19]
Yamauchi et al.

[11] Patent Number: 5,934,872
[45] Date of Patent: Aug. 10, 1999

[54] WASHER PUMP FOR SELECTIVELY SUPPLYING WASH FLUID TO TWO AREAS

[75] Inventors: Junpei Yamauchi; Kazuhiko Nagai, both of Yokohama, Japan

[73] Assignee: Jidosha Kenki Kogyo Kabushiki Kaisha, Yokohama, Japan

[21] Appl. No.: 08/834,526

[22] Filed: Apr. 4, 1997

[51] Int. Cl.$^6$ .................................................. F04D 29/50
[52] U.S. Cl. .................. 415/911; 415/152.1; 415/146
[58] Field of Search .................... 415/146, 152.1, 415/152.2, 154.1, 911; 137/100, 115.28, 119.01, 119.08; 417/279, 440, 442, 502

[56] References Cited

U.S. PATENT DOCUMENTS

| | | | |
|---|---|---|---|
| 4,824,332 | 4/1989 | Perkins et al. | 417/315 |
| 4,874,298 | 10/1989 | Mainardi et al. | 417/315 |
| 4,900,235 | 2/1990 | Perkins et al. | 417/315 |
| 4,919,591 | 4/1990 | Kamimura et al. | 415/152.1 |
| 5,344,293 | 9/1994 | Mota et al. | 417/442 |

FOREIGN PATENT DOCUMENTS

| | | | |
|---|---|---|---|
| 2186325 | 8/1987 | United Kingdom | 415/146 |

*Primary Examiner*—F. Daniel Lopez
*Assistant Examiner*—Matthew T. Shanley
*Attorney, Agent, or Firm*—Sughrue, Mion, Zinn Macpeak & Seas, PLLC

[57] ABSTRACT

A washer pump, which adapted to selectively supply wash fluid to one of front and rear windows of an automobile, comprises a valve mechanism. The valve mechanism has two wash fluid conduction pipes communicating with two wash fluid feed pipes in a pump body, two wash fluid delivery pipes, two valve seats provided on respective ends of two wash fluid conduction pipes and facing each other, and a valve body arranged between two valve seats and capable of closing one wash fluid passage at one valve seat on a low pressure side while opening the other wash fluid passage at the other valve seat on a high pressure side. The valve body has two diaphragms including elastically-deforming portions respectively, whereby the center area of one of two elastically-deforming portions acts as one side seal portion engageable with one valve seat and the center area of the other of two elastically-deforming portions acts as the other side seal portion engageable the other valve seat. The opposite sides of the two side seal portions are connected to opposite ends, respectively, of a piston member movable in response to fluid pressure on the diaphragms.

13 Claims, 10 Drawing Sheets

WASHER PUMP FOR SELECTIVELY SUPPLYING WASH FLUID TO TWO AREAS

BACKGROUND OF THE INVENTION

1. Field of the Invention

The present invention relates to a washer pump mounted in, for example, an automobile and adapted to selectively supply wash fluid in a washer tank to both front and rear windows.

2. Description of the Prior Art

In the past, as such a type of washer pump above described, for example, there has been one as shown by FIGS. 9 and 10. Referring to FIGS. 9 and 10, the washer pump 101 has a motor chamber 111 enclosing a reversibly rotatable motor 102, a wash fluid suction pipe 112 communicating with a washer tank, not shown, a pump chamber 113 communicating with the suction pipe 112 and enclosing the impeller 103 fixed to the output shaft 102a of the motor 102, and a pump case 110 integrally provided with two wash fluid feed pipes 114A, 114B communicating with the pump chamber 113.

The pump case 110 is integrally provided with the motor chamber 111, the suction pipe 112, the pump chamber 113, the two feed pipes 114A, 114B, two wash fluid delivery pipes 115A, 115B communicating with the two feed pipes 114A, 114B respectively, and two valve seats 116A, 116B each located between the two feed pipes 114A, 114B and the two delivery pipes 115A, 115B and facing each other. Also, mounted between the two valve seats 116A, 116B is an elastic membrane 104 which divides the space between the two valve seats 116A, 116B into one side space where the valve seat 116A is located and the other side space where the valve seat 116B is located.

The washer pump 101 acts in such a manner that the rotation of the impeller 103 in one direction by the actuation of the motor 102 causes wash fluid to flow through the feed pipes 114A, 114B from the pump chamber 113 to one side space where the valve seat 116A is located and the other side space where the valve seat 116B is located respectively, with difference in pressure between wash fluid in the feed pipe 114A and wash fluid in the feed pipe 114B, and then one wash fluid passage is closed by the elastic membrane 104 at the valve seat 116A (or the valve seat 116B) on low pressure side of the two feed pipes 114A, 114B while the other wash fluid passage is opened at the valve seat 116B (or the valve seat 116A) on high pressure side of the two feed pipes 114A, 114B, so that wash fluid is delivered from the delivery pipe 115B (or the delivery pipe 115A) communicating with the space where the valve seat 116B (or the valve seat 116A) is located. As well, the above-mentioned prior arts are disclosed by Japanese Patent Publication No. 5-49840 and U.S. Pat. No. 4,600,361.

The conventional washer pump 101 as described above, however, is actuated in such a manner that the difference in pressure between the two feed pipes 114A, 114B causes the center portion of the elastic membrane 104 to move toward the valve seat 116A (or the valve seat 116B) on the side of low pressure feed pipe 114A (or 114B) against the elastic force of the elastic membrane 104 to close one wash fluid passage at the valve seat 116A (or 116B), so that one of the two delivery pipes 115A, 115B is selected so as to deliver wash fluid. Accordingly, the force for moving the center portion of the elastic membrane 104 toward the valve seat on the low pressure side and the force (or the sealing force) for keeping the wash fluid passage closed decrease by the elastic force of the elastic membrane 104, and the effective pressure area of the elastic membrane 104 decreases by the amount corresponding to the extension of the center portion thereof, and therefore the selection of the delivery pipe to be closed or opened, namely, the change-over of the delivery pipes 115A, 115B may not be performed completely, or may consume much time, and further leakage of wash fluid from the delivery pipe to be closed may occur, and furthermore when high viscous wash fluid is used, the washer pump is actuated at low temperatures, or the voltage in the battery supplying electric power to the motor 102 has dropped, the center portion of the elastic membrane 104 hardly moves in an axial direction. As a result, it becomes difficult to change over the delivery pipes 115A, 115B.

Further, in the conventional washer pump 101, because the pump case 110 is integrally formed with the motor chamber 111, the suction pipe 112, the pump chamber 113, two feed pipes 114A, 114B, two delivery pipes 115A, 115B communicating with two feed pipes 114A, 114B respectively, and two valve seats 116A, 116B located between two feed pipes 114A, 114B and two delivery pipes 115A, 115B and facing each other, the pump case 110 enlarges to limit the degree of freedom for setting itself.

SUMMARY OF THE INVENTION

In view of above-described problems, it is an object of the present invention to provide an improved washer pump which can perform change-over of delivery directions of wash fluid completely and rapidly, thereby selectively supplying wash fluid through one selected from two delivery pipes, for example, when mounted in an automobile, to either front or rear windows without any leakage from the other delivery pipe under use of high viscous wash fluid, low temperature surroundings, or voltage dropped in a battery as well as under use of low or middle viscous wash fluid, ordinary temperature surroundings, or ordinary voltage.

It is another object of the present invention to provide an improved washer pump which can increase the degree of freedom for setting itself.

In accordance with one embodiment of the present invention, the washer pump comprises a pump body having two wash fluid feed pipes and feeding wash fluid through the two feed pipes with difference in pressure therebetween; and a valve mechanism having two wash fluid conduction pipes communicating with the two feed pipes, two wash fluid delivery pipes delivering wash fluid, two valve seats located between the two conduction pipes and the two delivery pipes respectively and facing each other, and a valve body movable between the two valve seats and having two seal portions engageable, namely, capable of making in contact with and departing from the two valve seats respectively, so that one wash fluid passage, which consists of the one feed pipe, the one conduction pipe, and the one delivery pipe, is closed at one of the two valve seats on low pressure side of the two feed pipes while the other wash fluid passage, which consists of the other feed pipe, the other conduction pipe, and the other delivery pipe, is opened at the other of the two valve seats on high pressure side of the two feed pipes.

In accordance with another embodiment of the present invention, the valve body of the valve mechanism has a generally deep dish-shaped diaphragm including bottom, so that the bottom acts as as seal portion movable between the two valve seats and engageable with the two valve seats respectively.

In accordance with another embodiment of the present invention, the valve body of the valve mechanism has two generally deep dish-shaped diaphragms including bottoms.

The bottoms are pushed in an axial direction to be connected each other, so that one of the bottoms acts as one side seal portion engageable with one of the two valve seats and the other of the bottoms acts as the other side seal portion engageable with the other of the two valve seats.

In accordance with another embodiment of the present invention, the bottoms of the two diaphragms may be connected to each other through a piston member.

In accordance with another embodiment of the present invention, the valve mechanism includes a first valve case having one of the two conduction pipes and one of the two valve seats, a second valve case having the other of the two conduction pipes and the other of the two valve seats, and a valve body holder holding the valve body. The first and second valve cases are provided with a first valve case side engaging portion which engages one side of the valve body holder and a second valve case side engaging portion which engages the other side of the valve body holder with the first and second valve case side engaging portions facing each other and the seal portions of the valve body being located between the two valve seats.

In accordance with another embodiment of the present invention, the piston member has two diaphragm connecting portions formed on both ends thereof and connected to each of the bottoms of the two diaphragms, a communicating passage passing through the two diaphragm connecting portions respectively, and a first air vent hole extending radialwardly from the communicating passage to the outer surface thereof, and the valve body holder has two diaphragm mounting portions formed on both sides thereof and mounting each of peripheries of the two diaphragms, and a second air vent hole passing through radialwardly.

In accordance with another embodiment of the present invention, the pump body has a body case having the two feed pipes integrally formed therein, with the two feed pipes being provided with feed pipe side engaging portions respectively, and the conduction pipes of the first and second valve cases are provided with conduction pipe side engaging portions which engage the feed pipe side engaging portions respectively so that the feed pipe side engaging portions and the conduction pipe side engaging portions are engaged each other and the two feed pipes are connected to the two conduction pipes respectively.

In accordance with another embodiment of the present invention, the pump body has a body case having the two feed pipes integrally formed therein, the two feed pipes are respectively connected to the two conduction pipes by using a tube.

In accordance with another embodiment of the present invention, the valve seats may be provided on end portions of the two conduction pipes respectively.

In accordance with another embodiment of the present invention, the valve seats may be provided on end portions of the two delivery pipes respectively.

In accordance with another embodiment of the present invention, the washer pump comprises a pump body having a motor including an output shaft and reversibly rotatable, an impeller firmly connected to the output shaft, and a first and second wash fluid feed pipes communicating with a pump chamber enclosing the impeller; a first and second valve cases having a first and second wash fluid conduction pipes respectively connected to the first and second feed pipes and located so as to face each other, a first and second wash fluid delivery pipes respectively juxtaposed to the first and second conduction pipes and located so as to face each other, and a first and second valve seats integrally formed on the first and second conduction pipes; and a valve mechanism having a valve body holder annularly shaped and arranged between the first and second valve cases, and a valve body consisting of an annular projection fitted between at least one of the first and second valve cases and the valve body holder, an elastically-deforming portion extended from the annular projection, and a pair of seal portions extended from the elastically-deforming portion and arranged so as to respectively oppose the first and second valve seats.

In accordance with another embodiment of the present invention, the valve body of the valve mechanism has a first annular projection fitted between the first valve case and the valve body holder, a first valve body forming member including a first seal portion engageable, namely, capable of coming in contact with and departing from the first valve seat formed on the first conduction pipe, a second annular projection fitted between the second valve case and the valve body holder, a second valve body forming member including a second seal portion engageable, namely, capable of coming in contact with and departing from the second valve seat formed on the second conduction pipe, with the first and second valve body forming members being provided with a first and second convex thick portions formed on opposite side surfaces with respect to the first and second seal portions, and a piston member including a first concave portion fitted to the first thick portion and a second concave portion fitted to the second thick portion, with the first and second concave portions being provided on both sides of the piston member.

In accordance with another embodiment of the present invention, the washer pump comprises a pump body having a motor including an output shaft and reversibly rotatable, an impeller firmly connected to the output shaft, and a first and second wash fluid feed pipes communicating with a pump chamber enclosing the impeller; a first and second valve cases having a first and second wash fluid conduction pipes respectively connected to the first and second feed pipes and located so as to face each other, a first and second wash fluid delivery pipes respectively juxtaposed to the first and second conduction pipes and located so as to face each other, and a first and second valve seats integrally formed on the first and second delivery pipes; and a valve mechanism having a valve body holder annularly shaped and arranged between the first and second valve cases, and a valve body consisting of an annular projection fitted between at least one of the first and second valve case and the valve body holder, an elastically-deforming portion extended from the annular projection, and a pair of seal portions extended from the elastically-deforming portion and arranged so as to respectively oppose the first and second valve seats.

In accordance with another embodiment of the present invention, the value body of the valve mechanism has a first annular projection fitted between the first valve case and the valve body holder, a first valve body forming member including a first seal portion engageable, namely, capable of coming in contact with and departing from the first value seat formed on the first delivery pipe, a second annular projection fitted between the second valve case and the valve body holder, a second valve body forming member including a second seal portion engageable, namely, capable of coming in contact with and departing from the second valve seat formed on the second delivery pipe, with the first and second valve body forming members being provided with a first and second convex thick portions respectively formed on opposite side surfaces with respect to the first and second seal portions, and a piston member including a first concave portion fitted to the first thick portion and a second concave portion fitted to the second thick portion, with the first and second concave portions being provided on both sides of the piston member.

In accordance with another embodiment of the present invention, the piston member is provided with a communicating passage passing through the first and second concave portions and of a diameter smaller than that of the first and second concave portions, and a first air vent hole communicating with the communicating passage.

In accordance with another embodiment of the present invention, the valve body holder is provided with a second air vent hole communicating with the first air vent hole of the piston member.

In the washer pump regarding one embodiment of the present invention, wash fluid is fed through the two feed pipes of the pump body and the two conduction pipes of the valve mechanism with difference in pressure to one side and the other side spaces which are divided by the valve body and in each of which each valve seat is situated, and then the seal portion of the valve body is moved toward the valve seat on low pressure side of the two conduction pipes to close one wash fluid passage while opening the other wash fluid passage, thereby delivering wash fluid from the delivery pipe communicating with the space where high pressure wash fluid flows.

In this case, the seal portions of the valve body are movable between the two valve seats, so that the force (or the changing force) for moving the seal portions toward the valve seat on low pressure side and the force (or the sealing force) for keeping one wash fluid passage closed increase, and any leakage of wash fluid from the delivery pipe to be closed does not occur, and further the change-over of the delivery pipes is performed rapidly and completely. In addition, although high viscous wash fluid is used, the washer pump is actuated at low temperatures, or the voltage in the battery for supplying electric power to the motor has dropped, the seal portions are moved smoothly between the two valve seats to assure the rapid and complete change-over of the delivery pipes.

In the washer pump regarding another embodiment of the present invention, the bottom of the generally deep dish-shaped diaphragm serves as a seal portion. Therefore, if the bottom as a seal portion is pushed in the axial direction and then the intermediate portion between the bottom and the periphery are kept in a slacked configuration, the seal portion can be moved with little resistance by the amount corresponding to the slackness in the axial direction between the two valve seats with the effective pressure area being kept constant. As a result, the changing force and the sealing force increase, and any leakage of wash fluid from the delivery pipe to be closed does not occur, and further the change-over of the delivery pipes is performed rapidly and completely. Also, although high viscous wash fluid is used, the washer pump is actuated at low temperatures, or the voltage in the battery has dropped, the change-over of the delivery pipes is performed rapidly and completely.

In the washer pump regarding another embodiment of the present invention, the two generally deep dish-shaped diaphragms are kept in such configurations that the intermediate portions between the bottoms and the peripheries are slacked, so that the respective bottoms of the two diaphragms connected each other, namely, one side and the other side seal portions are moved with little resistance by the amount corresponding to the slackness of the intermediate portions in the axial direction between the two value seats, and the respective effective pressure areas of both seal portions do not change by those movement. As a result, the changing force and the sealing force increase, so that any leakage of wash fluid from the delivery pipe to be closed does not occur, and the change-over of the delivery pipes is performed rapidly and completely. In addition, one side and the other side seal portions, when wash fluid is not fed from the pump body, is always kept approximately at the neutral position, so that the movement stroke of both seal portions upon the change-over of the delivery pipes becomes short, and the change-over is performed more rapidly.

In the washer pump regarding another embodiment of the present invention, one and the other side seal portions are moved stably between the two value seats, so that the change-over of the delivery pipes is performed more completely.

In the washer pump regarding another embodiment of the present invention, the first and second valve cases and the value body holder are assembled one another in such a manner that the first valve case side engaging portion of the first valve case and the second valve case side engaging portion of the second valve case are opposed each other with the valve body being arranged therebetween, and then one side of the valve body holder is engaged with the first value case side engaging portion and the other side of the valve body holder is engaged with the second valve case side engaging portion. Upon assembling, because the seal portions of the valve body are located between the two valve seats, consequently, the seal portions are arranged readily between the two value seats, and the maintenance of the valve mechanism is performed readily.

In the washer pump regarding another embodiment of the present invention, after the respective bottoms of the two diaphragms are firmly connected to the respective diaphragm connecting portions of the piston member and the respective peripheries of the two diaphragms are firmly connected to the diaphragm mounting portions of the valve body, the air existing within the communicating passage of the piston member is evacuated through the respective air vent holes of the piston member and the valve body holder, and at the same time the air existing between the two diaphragms is evacuated through the air vent hole of the valve body holder, so that the respective bottoms of the two diaphragms are pulled in both diaphragm connecting portions in the axial direction to be fixed therein, and the respective peripheries of the two diaphragms are fixed in the diaphragm mounting portions. In this state, closing the air vent hole of the valve body holder causes the intermediate portions between the bottoms and the peripheries of the two generally deep dish-shaped diaphragms to be kept in slacked configurations.

In the washer pump regarding another embodiment of the present invention, the maintenance of the pump body and the valve mechanism is performed readily. In addition, when either the pump body or the valve mechanism has broken down, the only one having broken down may be replaced to reduce the repair cost.

In the washer pump regarding another embodiment of the present invention, the pump body is arranged apart from the valve mechanism, so that the degree of freedom for arrangement increases.

In the washer pump regarding another embodiment of the present invention, the pressure of wash fluid fed through the two conduction pipes directly acts on the seal portions of the valve body in the axial direction, so that the seal portions are moved very smoothly.

In the washer pump regarding another embodiment of the present invention, although the seal portion of the valve body has attached to the valve seat provided on the end portion of the delivery pipe, the pressure of wash fluid from the pump body through the conduction pipe acts on the valve body to prevent the changing force from becoming very small, thereby preventing the seal portion of the valve body from keeping the wash fluid passage closed at the valve seat.

In the washer pump regarding another embodiment of the present invention, the seal portions are moved with little resistance by the amount corresponding to deformation of the elastically-deforming portions in the axial direction between the two value seats with the effective pressure areas thereof being kept constant, so that the changing force and the sealing force increase. Therefor, any leakage of wash fluid from the delivery pipe to be closed does not occur, and the change-over of the delivery pipes is performed rapidly and completely. In addition, the pressure of wash fluid fed through the two conduction pipes directly acts on the seal portions of the valve body in the axial direction, thereby moving the seal portions very smoothly. Further, the seal portions are arranged between the two valve seats readily, and the valve body is provided with elastically-deforming portions preformed, and therefore it is not necessary to form the elastically-deforming portions manually, so that man-hour for assembling is reduced, and the maintenance of the valve mechanism is performed readily.

In the washer pump regarding another embodiment of the present invention, as like the washer pump regarding the above mentioned embodiment, the changing force and the sealing force increase, so that any leakage of wash fluid from the delivery pipe to be closed does not occur, and the change-over of the delivery pipes is performed rapidly and completely. Further, the valve body with the first and second seal portions, when wash fluid is not fed from the pump body, is always kept approximately at the neutral position between the two valve seats, so that the movement stroke of both seal portions upon the change-over becomes short, and the change-over is performed more rapidly. In addition, because the piston member is provided between the first and second valve body forming members, the first and second seal portions, when wash fluid is fed from the pump body, are moved stably, thereby performing the change-over of the delivery pipes more completely.

In the washer pump regarding another embodiment of the present invention, because the valve body is provided with elastically-deforming portions, the seal portions are moved with little resistance between the two valve seats, and the effective pressure areas of the seal portions does not change. Therefore, the changing force and the sealing force increase and the change-over of the delivery pipes is performed rapidly and completely. In addition, although the seal portion of the valve body has attached to the valve seat provided on the end of the delivery pipe, because the pressure of wash fluid fed through the conduction pipe from the pump body acts on the valve body, the changing force does not become very small, thereby preventing the seal portion from keeping the wash fluid passage closed at the valve seat. Further, because the seal portions are arranged between the two valve seats readily and the valve body is provided with elastically deforming portions preformed, it is not necessary to form the elastically-deforming portions manually, and therefore man-hour for assembling is reduced and the maintenance of the valve mechanism is performed readily.

In the washer pump regarding another embodiment of the present invention, as like the washer pump regarding the above-mentioned embodiment, the changing force and the sealing force increase, so that the change-over of the delivery pipes is performed rapidly and completely. Further, the valve body with the first and second seal portions, when wash fluid is not fed from the pump body, is always kept approximately at the neutral position between the two valve seats, so that the movement stroke of both seal portions upon the change-over becomes short and the change-over is performed more rapidly. In addition, because the piston member is provided between the first and second valve body forming members, the first and second seal portions, when wash fluid is fed from the pump body, are moved stably, thereby performing the change-over of the delivery pipes more completely.

In the washer pump regarding another embodiment of the present invention, after the respective thick portions of the two valve body forming members are firmly connected to both concave portions of the piston member, the air existing within the communicating passage of the piston member is evacuated through the first air vent hole, so that the respective thick portions of the two valve body forming members are pulled in both concave portions of the piston member to be fixed therein.

In the washer pump regarding another embodiment of the present invention, after the respective thick portions of the two valve body forming members are firmly connected to both concave portions of the piston member and the respective annular projections of the two valve body forming members are fitted between the valve cases and the valve body holder, the air existing within the communicating passage of the piston member is evacuated through the respective air vent hole of the piston member and the valve body holder and, at the same time, the air existing between the two valve body forming members is evacuated through the second air vent hole of the valve body holder. In this state, closing the second air vent hole of the valve body holder causes the respective thick portions of the two valve body forming members to be firmly fixed in both concave portions of the piston member respectively, and causes the respective annular projections of the two valve body forming members to be firmly fixed between the valve cases and the valve body holder.

The other objects and features of the present invention will become understood from the following description with reference to the accompanying drawings.

DETAILED DESCRIPTION OF THE PREFERRED EMBODIMENTS

The present invention will be described in further detail with reference to the accompanying drawings.

Figure 1:
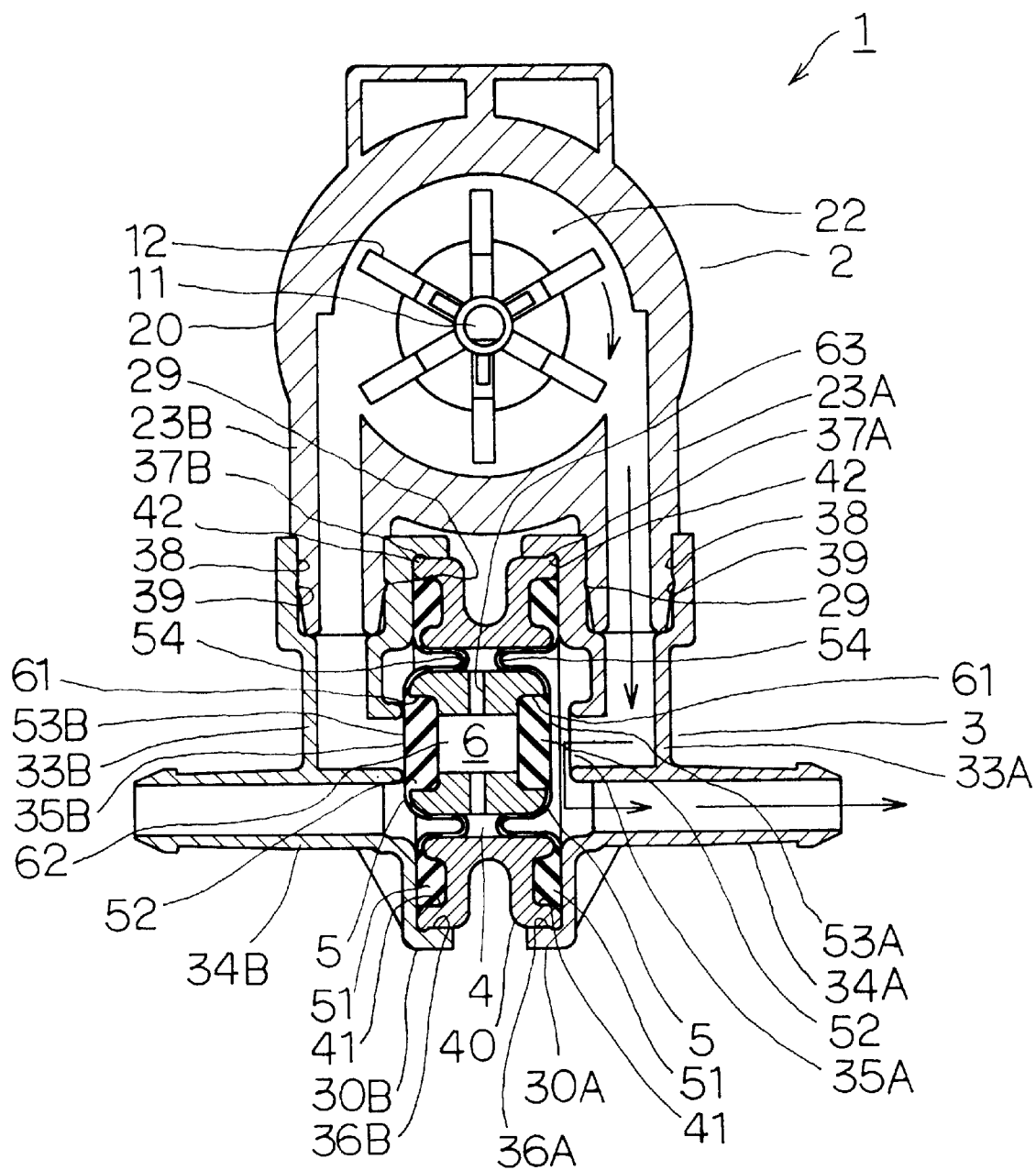
FIG. 1 is a horizontal sectional view along the wash fluid feed pipes of the pump body showing one embodiment of a washer pump according to the present invention.
Figure 2:
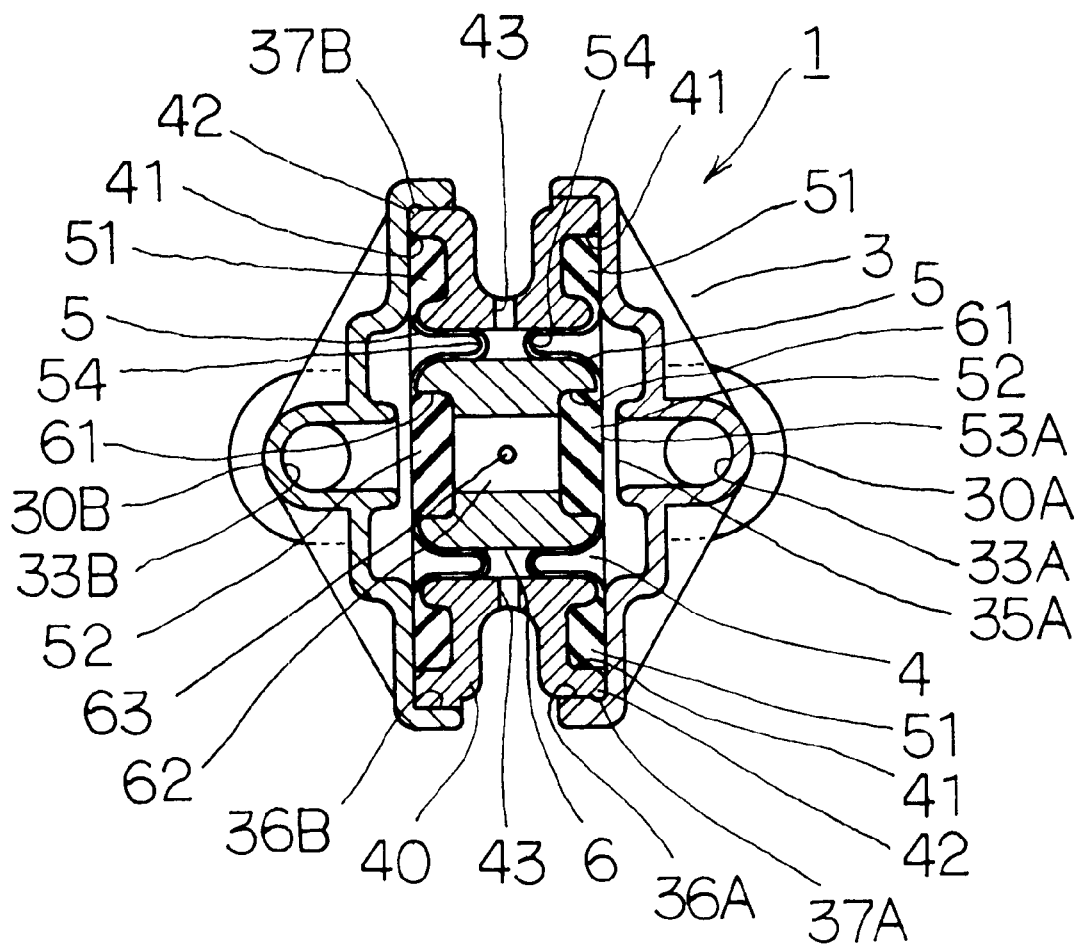
FIG. 2 is a vertical sectional view along the valve seats of the washer pump seen in FIG. 1.
Figure 3A:
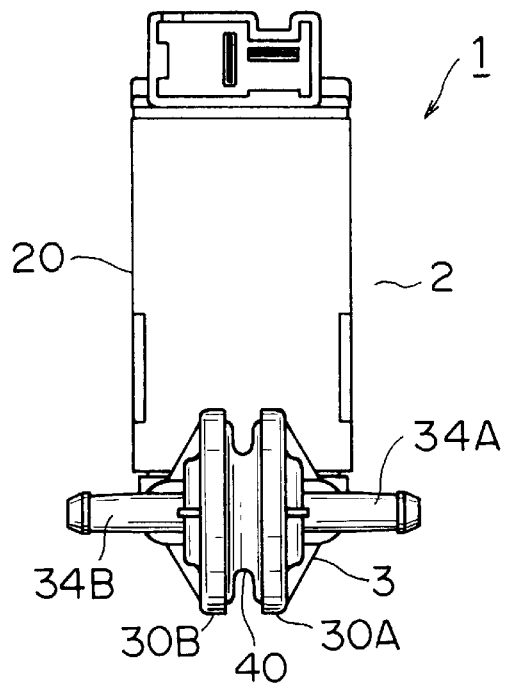
FIG. 3a is a front view of the washer pump seen in FIG. 1.
Figure 3B:
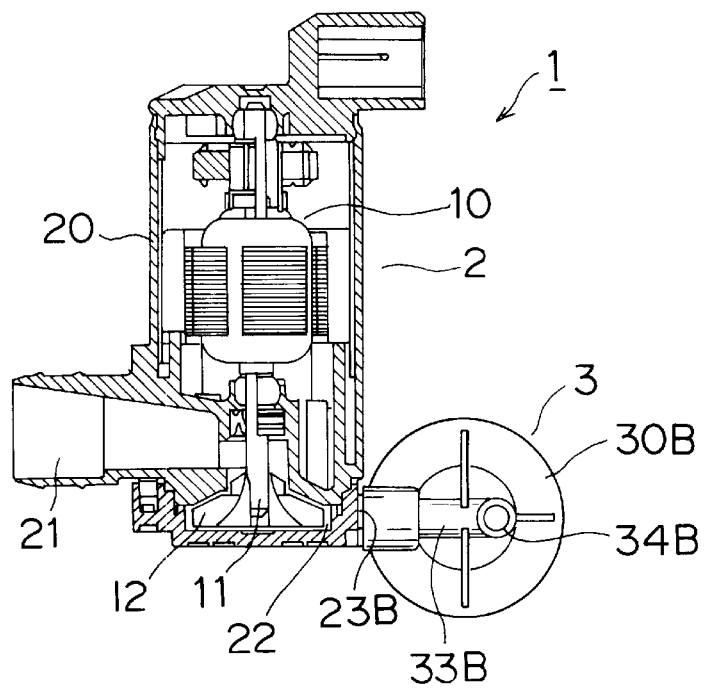
FIG. 3b is a side sectional view of the washer pump seen in FIG. 1.

FIGS. 1–6 show washer pumps according to the present invention. As shown by FIG. 3, the washer pump 1 has a pump body 2 and a valve mechanism 3. The pump body 2 has a body case 20 enclosing a reversibly rotatable motor 10. The body case 20 is integrally provided with a wash fluid suction pipe 21 communicating with a washer tank, not shown, a pump chamber 22 communicating with the suction pipe 21 and enclosing an impeller 12 fixed to the output shaft 11 of the motor 10, and two wash fluid feed pipes 23 (23A, 23B) communicating with the pump chamber 22, as shown by FIG. 1.

The valve mechanism 3, on the other hand, as shown by FIG. 2, has two wash fluid conduction pipes 33 (33A, 33B) communicating with the feed pipes 23 (23A, 23B) respectively, two wash fluid delivery pipes 34 (34A, 34B) delivering wash fluid, two valve seats 35 (a first valve seat 35A and a second valve seat 35B) respectively formed at the end portions of the conduction pipes 33 (33A, 33B).

One (first wash fluid conduction pipe) 33A of the conduction pipes 33 (33A, 33B) and one (first wash fluid delivery pipe) 34A of the delivery pipes 34 (34A, 34B) are integral-formed in a first valve case 30A, and the other (second wash fluid conduction pipe) 33B and the other (second wash fluid delivery pipe) 34B are integral-formed in a second valve case 30B, and further, the first and second valve cases 30A, 30B are arranged so as to oppose the valve seats 35 (35A, 35B) respectively.

The valve mechanism 3, also, has a valve body 4 located between two valve seats 35 and comprising two diaphragms 5, 5 (first and second valve body forming members). The diaphragms 5, 5 are supported on a valve body holder 40 with the annular projections 51, 51 provided at the peripheries thereof being respectively fitted into the annular grooves 41, 41 (diaphragm mounting portions) provided on both side surfaces of the generally ring-shaped value body holder 40 shown by FIG. 5.

The valve body 4, further, is assembled in such a manner that one side of the valve body holder 40 is fitted into the first valve case side engaging portion 36A provided on the first valve case 30A with one diaphragm 5 being opposed to the valve seat 35A, and the other side of the valve body holder 40 is fitted into the second valve case side engaging portion 36B provided on the second valve case 30B with the other diaphragm 5 being opposed to the valve seat 35B, and further, the annular projections 42, 42 provided on both fitting portions of the valve body holder 40 are engaged with the annular grooves 37A, 37B provided on the first and second valve case side fitting portions 36A, 36B, so that the valve body 4 is firmly connected to the first and second valve case 30A, 30B respectively.

Figure 4:
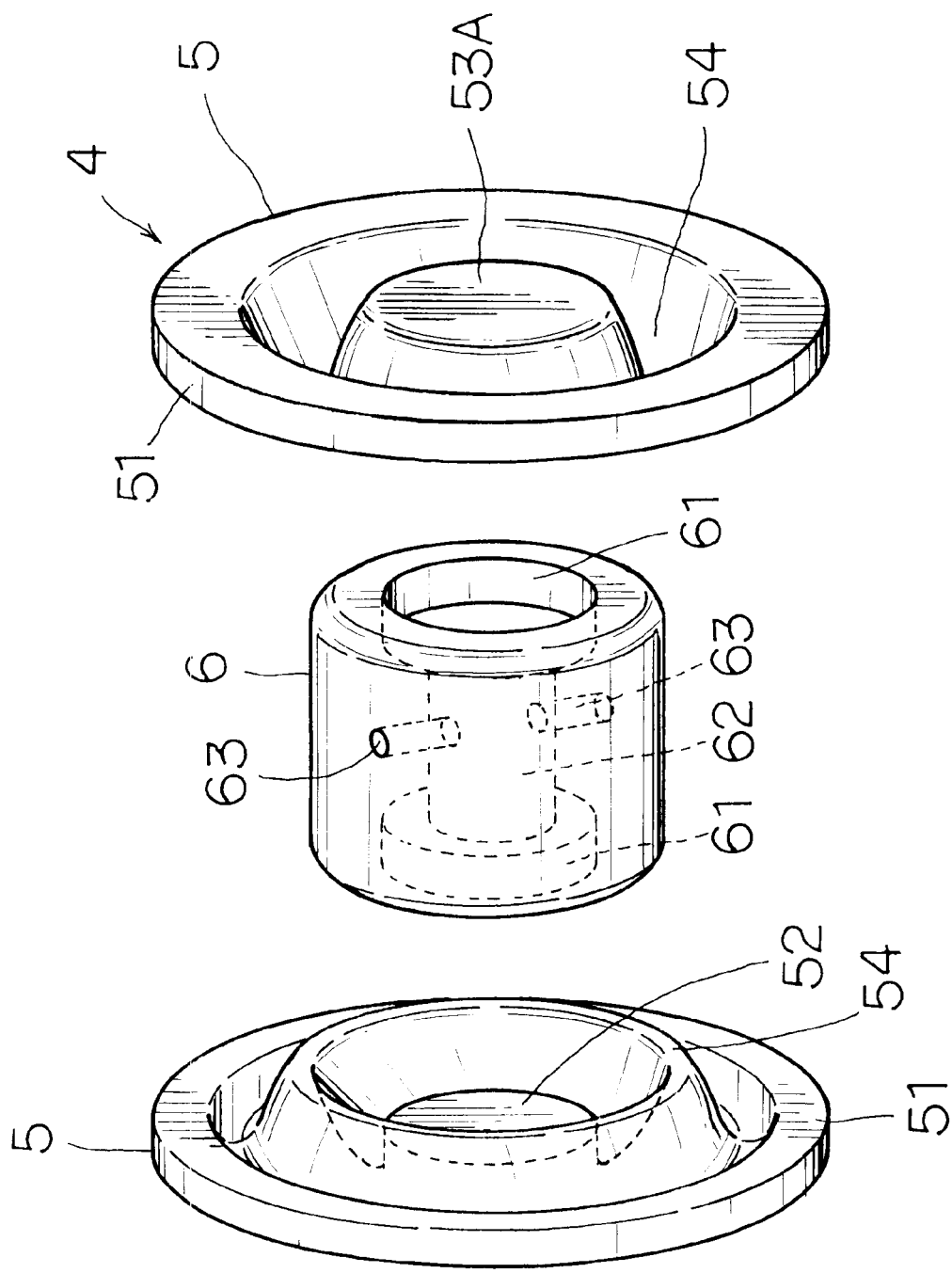
FIG. 4 is an exploded perspective view of the diaphragms as a valve body forming members and the piston member of the valve mechanism regarding the washer pump seen in FIG. 1.
Figure 5B:
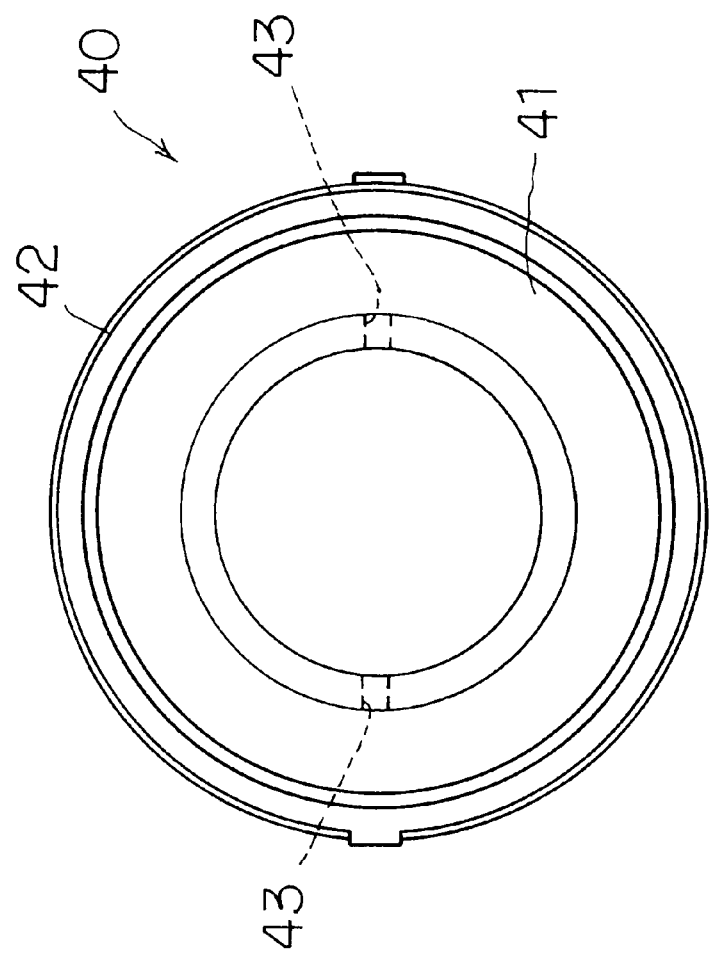
FIG. 5b is a side view of the valve body holder supporting the valve body of the valve mechanism regarding the washer pump seen in FIG. 1.
Figure 5A:
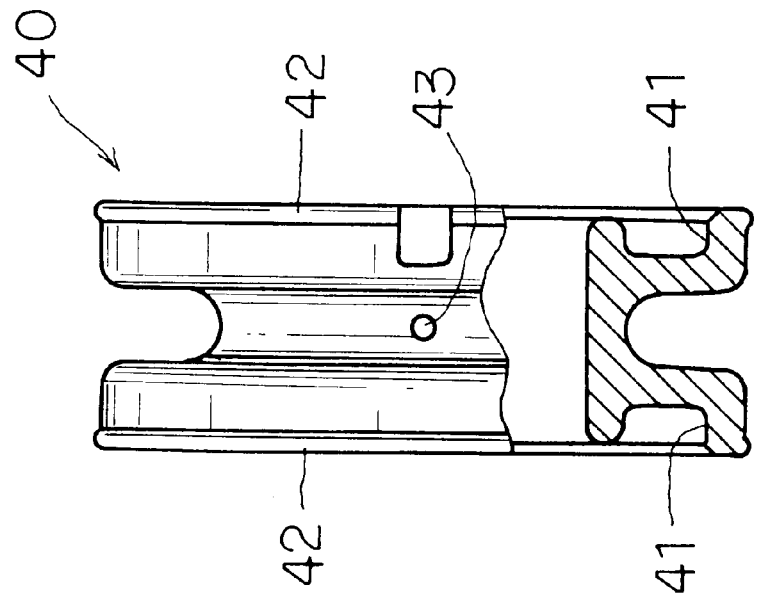
FIG. 5a is a fragmentary sectional and front view of the valve body holder supporting the valve body of the valve mechanism regarding the washer pump seen in FIG. 1.

In this arrangement, the diaphragms 5, 5, as shown by FIG. 4, are provided with the annular projections 51, 51 above described, the elastically-deforming portions 54, 54 preformed so as to be slacked toward the centers of the annular projections 51, 51, and the thick portions 52, 52 provided on the respective center areas thereof. The respective thick portions 52, 52 are fitted into the respective concave portions 61, 61 (diaphragm connecting portions) provided on both end portions of the piston member 6 respectively to be connected each other with the piston member 6 being sandwiched therebetween, whereby the opposite side surface of one of the thick portions 52 acts as one side seal portion (first seal portion) 53A engageable with one 35A of the valve seats 35, and the opposite side surface of the other of the thick portions 52 acts as the other side seal portion (second seal portion) 53B engageable with the other 35B of the valve seats 35.

In this embodiment, the piston member 6 has the concave portions 61, 61 above described, a communicating passage 62 provided along the center axis of the piston member 6 and passing through the concave portions 61, 61, and an air vent hole (first air vent hole) 63 extending radially from the communicating passage 62 and opening at the outer cylindrical surface.

On the other hand, the valve body holder 40 is provided with an air vent hole (second air vent hole) 43 passing through itself in the radial direction. The air existing within the communicating passage 62 of the piston member 6 is evacuated through the respective air vent hole 63, 43 of the piston member 6 and the valve body holder 40, and at the same time, the air existing between the diaphragms 5, 5 is evacuated through the air vent hole 43 of the valve body holder 40, whereby the respective thick portions 52, 52 of the diaphragms 5, 5 are pulled into the respective concave portions 61, 61 to firmly fixed therein.

Namely, this allows both seal portions 53A, 53B connected each other by means of the piston member 6 to be moved by the amount corresponding to the elastic deformation of the elastically-deforming portions 54, 54 of the diaphragms 5, 5 in the axial direction with little resistance. Therefore, in the case shown by FIG. 1, closed at the valve seat 35B on the conduction pipe 33B communicating with the one feed pipe which feeds low pressure wash fluid is one wash fluid passage, while opened at the vale seat 35A on the conduction pipe 33A communicating with the other feed pipe which feeds high pressure wash fluid is the other wash fluid passage.

In this embodiment, further, provided on the outer surfaces of the respective end portions of the feed pipes 23 (23A, 23B) of the body case 20 are annular projections (feed pipe side engaging portions) 29, and provided on the inner surfaces of the respective conduction pipes 33 (33A, 33B) of the first and second valve case 30A, 30B of the valve mechanism 3 are large openings 38 and annular grooves 39 (conduction pipe side engaging portions) within the large openings 38. Therefore, the respective end portions of the feed pipes 23 (23A, 23B) are fitted into the respective large openings 38, and then the annular projections 29 on the feed pipes 23 (23A, 23B) are engaged with the annular grooves 39 on the conduction pipe 33 (33A, 33B), so that the first and second valve case 30A, 30B of the valve mechanism 3 are firmly connected to the body case 20.

The washer pump 1, as shown by FIG. 1, is actuated in such a manner that the impeller 12 is rotated, for example, in the clockwise direction by driving the motor 10 in the pump body 2, and wash fluid sucked into the pump chamber 22 from the washer tank through the suction pipe 21 is fed through the feed pipes 23 and the conduction pipes 33 of the valve mechanism 3 to one side space where the valve seat 35A is located and the other side space where the valve seat 35B is located, with the difference in pressure, whereby both seal portions 53A, 53B of the valve body 4 are moved with the piston member 6 toward the valve set 35B on the end portion of the conduction pipe 33B communicating with the feed pipe 34B feeding low pressure wash fluid to close the one wash fluid passage at the valve seat 35B while opening the other wash fluid passage at the valve seat 35A on the end portion of the conduction pipe 33A communicating with the feed pipe 34A feeding high pressure wash fluid and then high pressure wash fluid is delivered from the feed pipe 34A to a desired area.

In the actuation above-mentioned, since the diaphragms 5, 5 of the valve body 4 have the elastically-deforming portions 54, 54 respectively, and the air within the communicating passage of the piston member and the air between the diaphragms 5, 5 have been evacuated through the respective air vent hole 63, 43 of the piston member 6 and the valve body holder 40, one side seal portion 53A and the other side seal portion 53B can be moved in the axial direction with little resistance by the easy deformation of the elastically-deforming portions, and the respective effective pressure areas of both seal portions 53A, 53B are not affected by the movement above-mentioned.

Accordingly, the force (the changing force) for moving the seal portions 53A, 53B toward the low pressure side valve seat 35 (35B in FIG. 1) and the force (sealing force) for keeping one wash fluid passage on low pressure side closed increase, so that any leakage of wash fluid from the delivery pipe 34 to be closed (34B in FIG. 1) does not arise, and the change-over of the delivery pipes 34 can be performed rapidly and completely. In addition, the valve body 4 with both seal portions 53A, 53B, when wash fluid is not fed from the pump body 2, always stops at the neutral position between the valve seats 35A, 35B, whereby the movement stroke of both seal portions 53A, 53B upon the change-over of the delivery pipes 34 becomes short and then the change-over of the delivery pipes 34 can be performed rapidly and completely. Further, even though high viscous wash fluid is used, the wash pump 1 is used at low temperatures, or the voltage in the battery supplying electric power to the wash pump 1 has dropped, since both seal portions 53A, 53B are moved by short distance smoothly between the valve seats 35 (35A, 35B), the change-over of the delivery pipes can be performed rapidly and completely.

In the washer pump 1, also, since the respective thick portions 52, 52 of the diaphragms 5, 5 are connected to the piston member, both seal portions 53A, 53B can be moved stably between the valve seats 35 (35A, 35B), and therefore the change-over of the delivery pipes 34 can be performed more completely.

In the washer pump 1, further, the respective valve seats 35 (35A, 35B) are provided on the end portions of the conduction pipes 33, so that the pressure of wash fluid fed through the conduction pipes 33 directly acts on both seal portions 53A, 53B of the valve body 4 in the axial direction to move both seal portions very smoothly.

In the washer pump 1, furthermore, the first valve case side engaging portion 36A of the first valve case 30A and the second valve case side engaging portion 36B of the second valve case 30B are opposed each other with the valve body 4 being arranged therebetween, and the one side of the valve body holder 40 is fitted into the first valve case side engaging portion 36A and the other side of the valve body holder 40 is fitted into the second valve case side engaging portion 36B, further, the respective annular projections 42, 42 of the valve body holder 40 are engaged with the respective annular grooves 37A, 37B of the first and second valve case side engaging portions 36A, 36B, so that the assembling of the first and second valve case 30A, 30B and the valve body holder 40 is accomplished. In this assembling, since both seal portions 53A, 53B of the valve body 4 are situated between the valve seats 35 (35A, 35B), both seal portions 53A 53B can be arranged between the valve seats 35 (35A, 35B) readily, and the valve mechanism 3 can be maintained readily. In addition, since the diaphragms 5, 5 of a valve body forming member are provided with the elastically-deforming portions 54 with the slacked configurations, when mounted to the piston member 6, the elastically-deforming portions 54 do not need to be formed manually and therefore the man-hour for assembling can be reduced.

In the washer pump 1, furthermore, the respective end portions of the feed pipes 23 (23A, 23B) of the pump body 2 are fitted into the respective large openings 38 of the conduction pipes 33 (33A, 33B) of the valve case 30A, 30B, and the respective annular projections 29 on the feed pipes 23 (23A, 23B) are engaged with the annular grooves 39 on the conduction pipes 33 (33A, 33B), so that the first and second valve case 30A, 30B of the valve mechanism 3 are mounted to the body case 20, and therefore the pump body 2 and the valve mechanism 3 can be maintained readily. In addition, when either the pump body 2 or the valve mechanism 3 has broken down, the only one having broken down can be replaced. As a result, the repair cost can be reduced.

Figure 6:
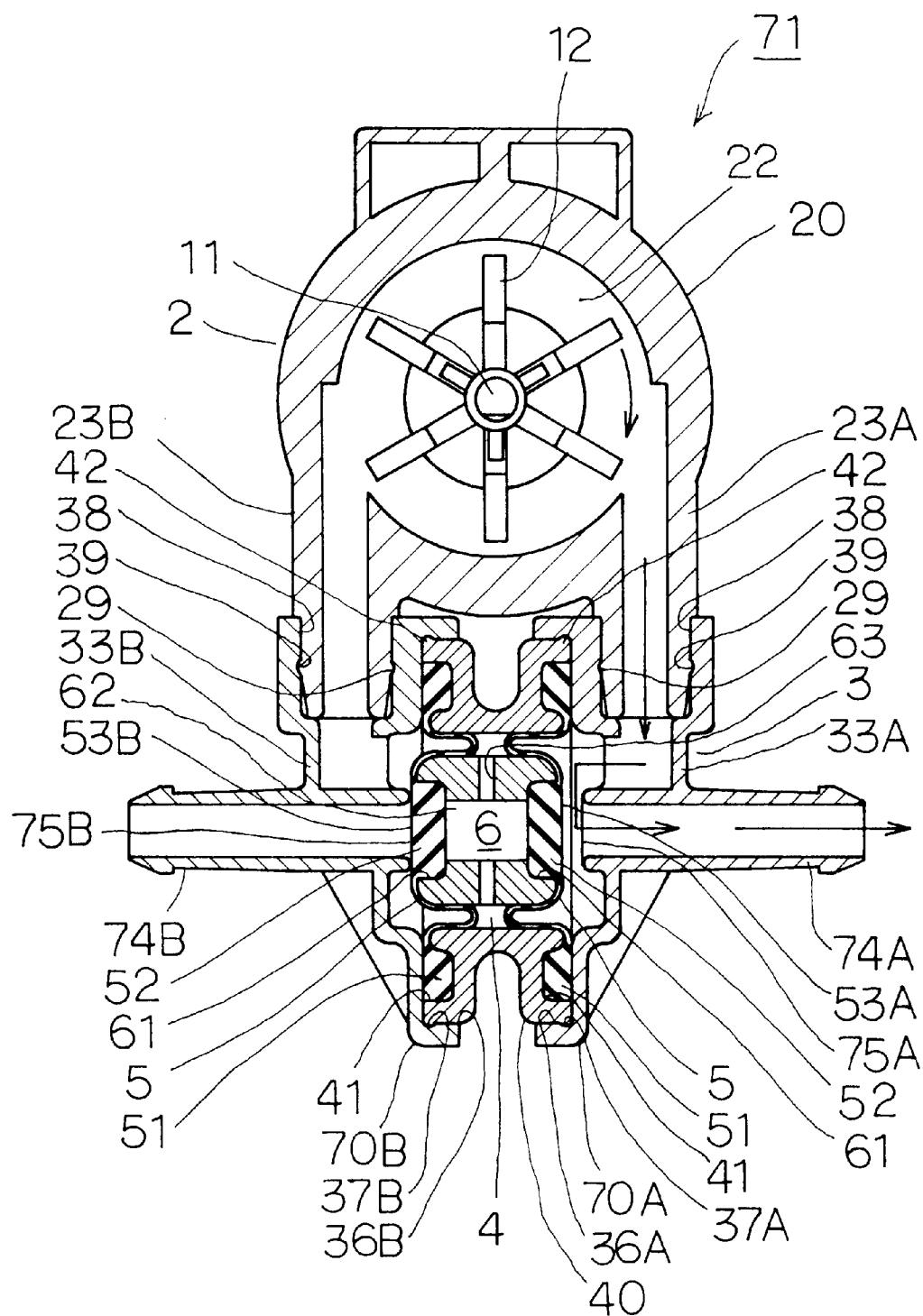
FIG. 6 is a horizontal sectional view along the wash fluid feed pipes showing another embodiment of a washer pump according to the present invention.

FIG. 6 shows a still another embodiment of a washer pump according to the present invention. As shown by FIG. 6, the washer pump 71 regarding this embodiment is different from the washer pump 1 regarding the above-mentioned embodiment in that two valve seats 75 (75A, 75B) are provided on the respective end portions of the delivery pipes 74 (74A, 74B) of the first and second valve cases 70A, 70B. Other constitutions of the washer pump 71 are identical with those of the washer pump 1 regarding the above-mentioned embodiment.

In the washer pump 71, even though both seal portions 53A, 53B of the valve body 4 have attached to the respective valve seats 75 (75A, 75B) provided on the respective end portions of the delivery pipes 74 (74A, 74B), the pressure of the wash fluid from the pump body 2 through the conduction pipes 33 (33A, 33B) acts on the valve body 4 to prevent the changing force from becoming very small, thereby preventing one of seal portions 53A, 53B of the valve body 4 from keeping the one wash fluid passage closed at the valve seat 75 (75B in FIG. 7) on the low pressure side.

Figure 7:
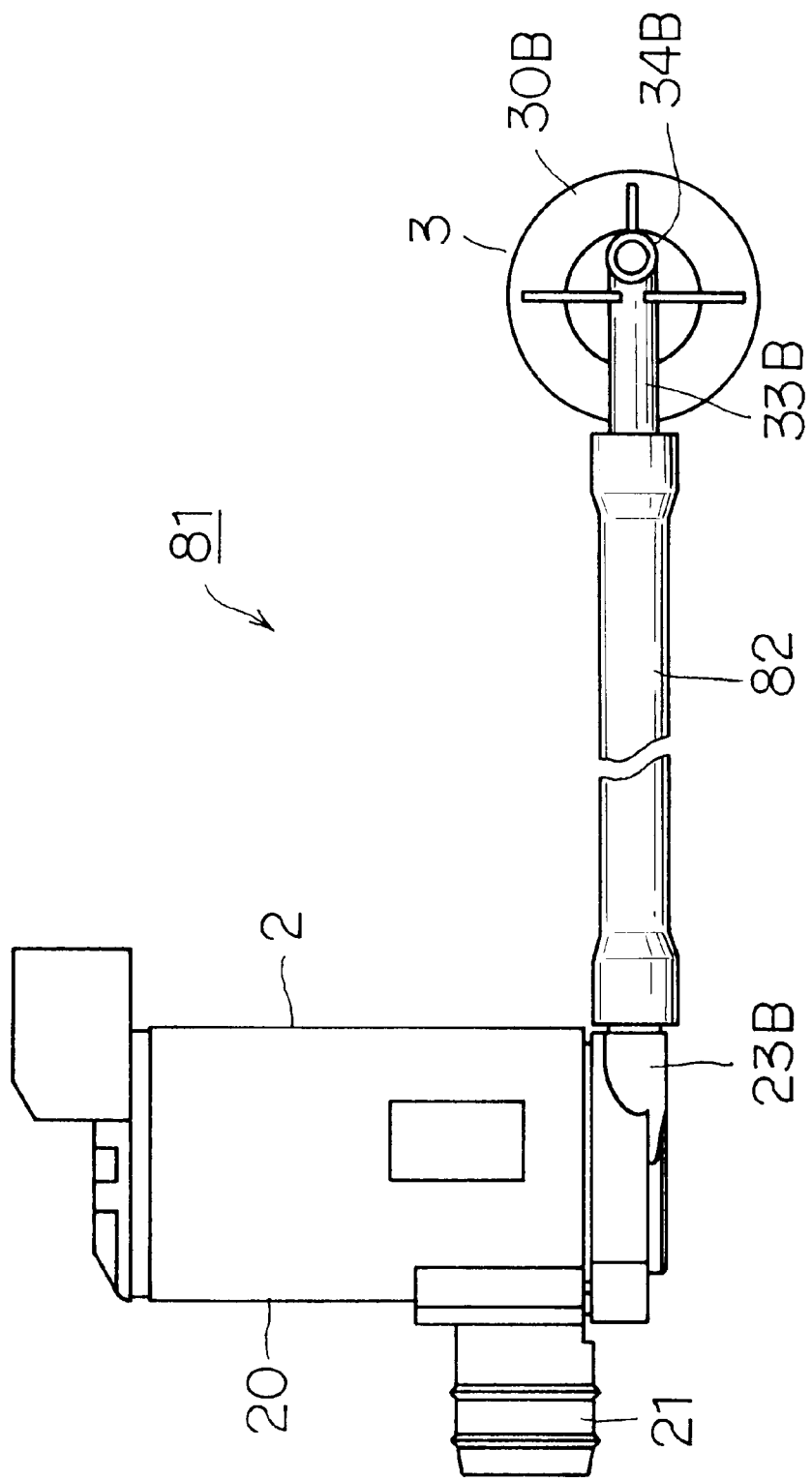
FIG. 7 is a side view showing still another embodiment using a tube of a washer pump according to the present invention.

FIG. 7 shows another embodiment of a washer pump according to the present invention. As shown by FIG. 7, the washer pump 81 regarding this embodiment is different from the washer pump 1 regarding the aforementioned embodiment in that the feed pipes 23 of the body case 20 are connected to the conduction pipes 33 of the first and second valve cases 30A, 30B respectively by using a tube 82. Other constitutions of the washer pump 81 are identical with those of the washer pump 1 regarding the afore-mentioned embodiment.

In the washer pump 81, the pump body 2 and the valve mechanism 3 can be arranged so as to be apart from each other, and therefore the degree of freedom for arrangement can be increased.

Figure 8:
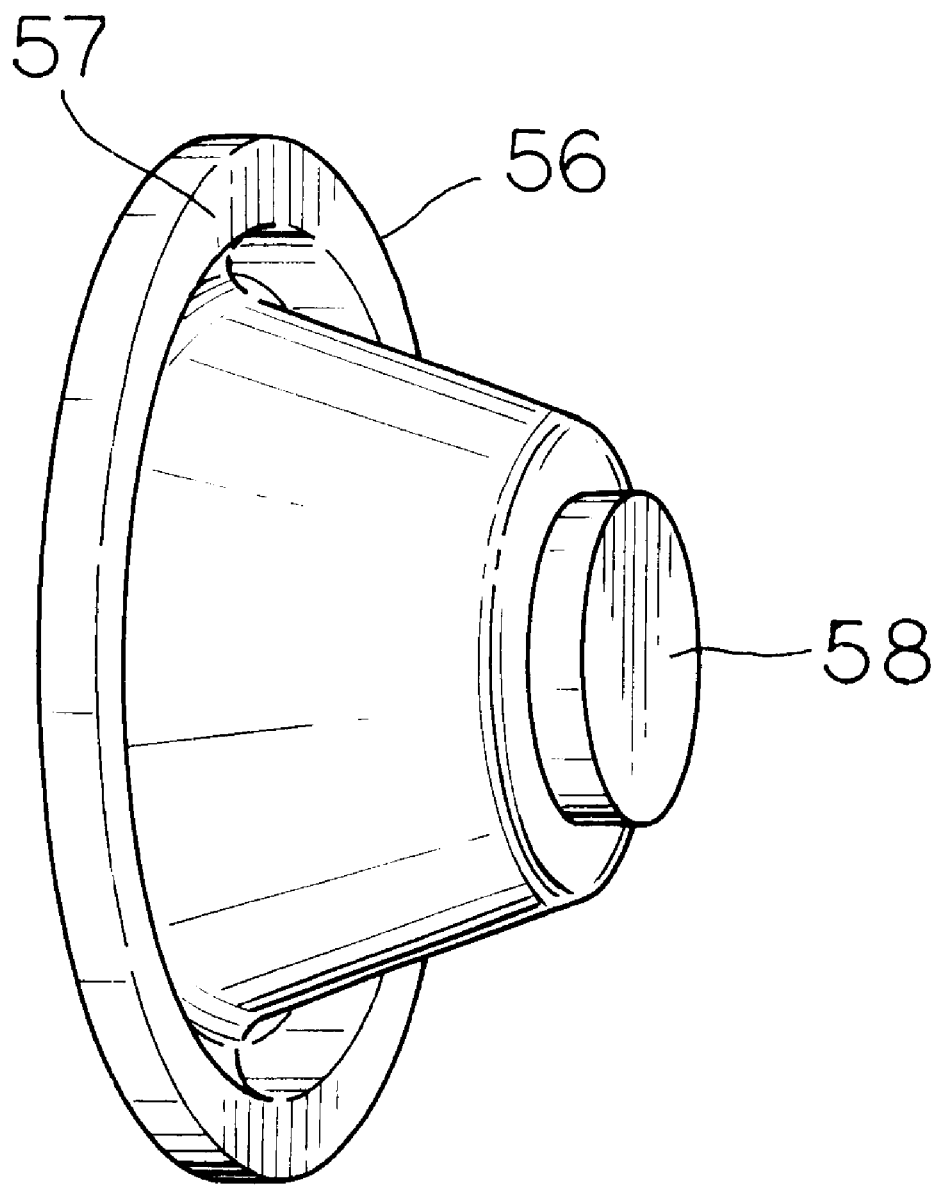
FIG. 8 is a perspective view of the deep dish-shaped diaphragm showing another embodiment of a valve body forming member adapted to a washer pump according to the present invention.
Figure 9:
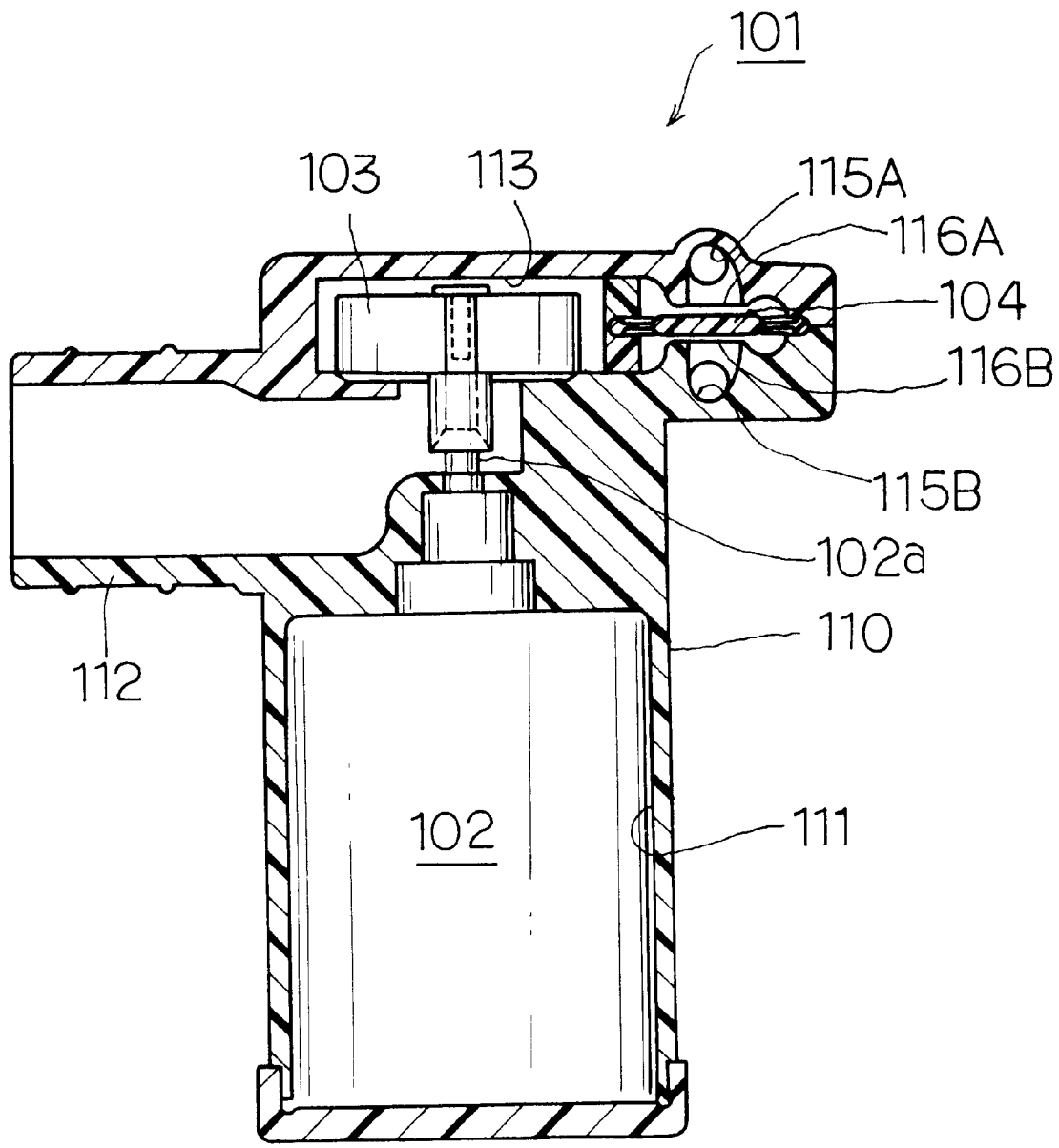
FIG. 9 is a vertical sectional view showing a washer pump according to the prior art.
Figure 10:
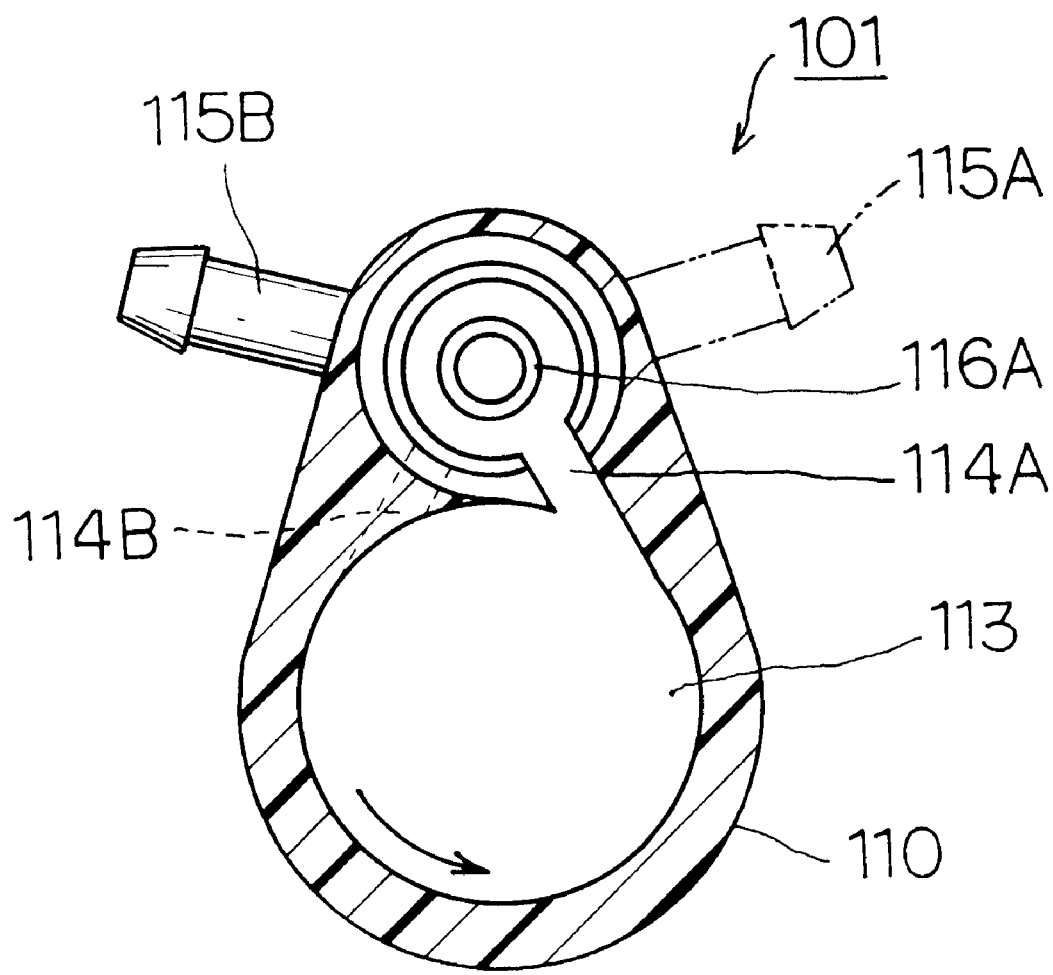
FIG. 10 is a horizontal sectional view along one wash fluid feed pipe of the washer pump seen in FIG. 9.

In the above-mentioned embodiment, the diaphragms 5 as valve body forming members have elastically-deforming portions preformed into slacked configurations. However, each valve body forming member, as shown by FIG. 8 (one of them is shown), may be formed as a generally deep dish-shaped diaphragm 56 having an annular projection 57 at the periphery and a thick portion 58 at the bottom. When the diaphragms 56 are mounted to the piston member 6, the thick portions 58 are pushed in the axial direction to be fitted into the concave portions 61 of the piston member 6, and the air existing within the communicating passage 62 of the piston member 6 is evacuated through the respective air vent hole 63, 43 of the piston member 6 and the valve body case 40, and further the air existing between the diaphragms 56 is evacuated through the air vent hole 43 of the valve body holder 40, and therefore the respective intermediate portions between the bottoms and the peripheries of the diaphragms 56 can be slacked or folded to be formed as elastically-deforming portions.

As described above, in the washer pump of the present invention regarding one embodiment, the advantageous effects obtained are as follows: The seal portions of the valve body can be moved between two valve seats with little resistance, and therefore the force (changing force) for moving the seal portions toward the valve seat on the low pressure side and the force (sealing force) for keeping one wash fluid passage on the low pressure side closed can be increased. Further, even though high viscous wash fluid is used, the washer pump is actuated at low temperatures, or the voltage in the battery supplying electric power to the washer pump has dropped, the wash fluid passage in one conduction pipe on the low pressure side is closed completely at the valve seat, whereby any leakage of wash fluid from one conduction pipe to be closed does not arise, and the change-over of the delivery pipes can be performed rapidly and completely.

In the washer pump of the present invention regarding another embodiment, also, advantageous effects obtained are as follows: If the seal portion or the bottom of the generally deep dish-shaped diaphragm is pushed in the axial direction and then the intermediate portion between the bottom and the periphery are kept in a slacked configuration, the seal portion can be moved by the amount corresponding to the slackness in the axial direction between the valve seats with little resistance, and can be moved with the effective pressure area thereof being kept constant. As a result, the changing force and the sealing force can be increased, and even though high viscous wash fluid is used, the washer pump is actuated at low temperatures, or the voltage in the battery has dropped, any leakage of wash fluid from the delivery pipe to be closed does not arise, and the change-over of the delivery pipes can be performed rapidly and completely.

Further, in the washer pump of the present invention regarding another embodiment, advantageous effects obtained are as follows: Two generally deep dish-shaped diaphragms are kept with the intermediate portions between the bottoms and the peripheries being slacked. This allows the respective bottoms of the diaphragms connected to each other by the piston, namely, one side and the other side seal portions to be moved with little resistance by the amount corresponding to the slackness of the intermediate portions in the axial direction between two valve seats, and to be moved with the effective pressure areas thereof being kept constant. As a result, the changing force and the sealing force can be increased, and any leakage of wash fluid from the delivery pipe to be closed does not occur, and further the change-over of the delivery pipes can be accomplished rapidly and completely. In addition, the valve body with one side and the other side seal portions, when wash fluid is fed from the pump body, is kept at the neutral position between two valve seats, and therefore the movement stroke of both seal portions upon the change-over of the delivery pipes becomes short, whereby the change-over is performed more rapidly.

Further, in the washer pump of the present invention regarding another embodiment, advantageous effects obtained are as follows: One and the other side seal portions can be moved stably between two valve seats, and the change-over of the delivery pipes can be performed more completely.

Furthermore, in the washer pump of the present invention regarding another embodiment, advantageous effects obtained are as follows: The first and second valve cases and the valve body holder can be assembled to one another in such a manner that the first valve case side engaging portion of the first valve case and the second valve case side engaging portion of the second valve case are opposed each other with the valve body being arranged therebetween, and then one side of the valve body holder is engaged with the first valve case side engaging portion and the other side of the valve body holder is engaged with the second valve case side engaging portion. Upon the assembling above-mentioned, since the seal portions of the valve body are located between two valve seats, consequently, the seal portions of the valve body can be arranged readily between two valve seats, and the maintenance of valve mechanism can be performed readily.

Furthermore, in the washer pump of the present invention regarding another embodiment, advantageous effects obtained are as follows: After the respective bottoms of two diaphragms are firmly connected to the respective diaphragm connecting portions of the piston member and the respective peripheries of two diaphragms are firmly connected to the diaphragm mounting portions of the valve body holder, the air existing within the communicating passage and between two diaphragms is evacuated through the respective air vent holes of the piston member and the valve body holder. This allows the respective bottoms of two diaphragms to be pulled in the axial direction and the intermediate portions between the respective bottoms and peripheries of two generally deep dish-shaped diaphragms to be kept in slacked configurations.

Furthermore, in the washer pumps of the present invention regarding another two embodiments, advantageous effects obtained are as follows: In the one embodiment, the maintenance of the pump body and the valve mechanism can be performed readily. In addition, when either the pump body or the valve mechanism has broken down, the only one having broken down can be replaced, and therefore the repair cost can be reduced. In the other embodiment, on the other hand, the pump body and the valve mechanism can be arranged so as to be apart from each other, and therefore the degree of freedom for arrangement can be increased.

Furthermore, in the washer pump of the present invention regarding still another two embodiments, advantageous effects obtained are as follows: In the one embodiment, the pressure of wash fluid fed through two conduction pipes directly acts on the seal portions of the valve body in the axial direction. As as result, the seal portions can be actuated very smoothly. In the other embodiment, on the other hand, even though the seal portion of the valve body has attached to the valve seat provided on the end portion of the delivery pipe, since the pressure of wash fluid from the pump body through the conduction pipe acts on the valve body to prevent the changing force from becoming very small. Accordingly, it is possible to prevent the seal portion of the valve body from keeping the wash fluid passage closed at the valve seat on the low pressure side.

Furthermore, in the washer pump of the present invention regarding another embodiment, advantageous effects obtained are as follows: The seal portions can be moved with little resistance by the amount corresponding to the deformation of the elastically-deforming portions in the axial direction between two valve seats and can be moved with the effective pressure areas thereof being kept constant, and therefore the changing force and the sealing force can be increased. As a result, even though high viscous wash fluid is used, the washer pump is actuated at low temperatures, or the voltage in the battery for actuating the washer pump has dropped, any leakage of wash fluid from the delivery pipe to be closed does not occur, and the change-over of the delivery pipes can be performed rapidly and completely. In addition, since the pressure of wash fluid fed through two conduction pipes can act on the seal portions of the valve body directly in the axial direction, the seal portion can be actuated very smoothly. Further, the seal portions of the valve body can be arranged or located readily between two valve seats. Furthermore, since the valve body is provided with elastically-deforming portions preformed, it is not necessary to form the elastically-deforming portions manually, and therefore man-hour for assembling can be reduced, and further the maintenance of the valve mechanism can be carried out readily.

Furthermore, in the washer pump of the present invention regarding another embodiment, advantageous effects obtained are as follows: like the washer pump above-mentioned, the changing force and the sealing force can be increased. As a result, when high viscous wash fluid is used, the washer pump is actuated at low temperatures, or the voltage in the battery for actuating the washer pump has dropped, any leakage of wash fluid from the delivery pipe to be closed does not occur, and the change-over of the delivery pipes can be performed rapidly and completely. In addition, since the valve body with the first and second seal portions, when wash fluid is not fed from the pump body, is always situated or kept approximately at the neutral position between two valve seats, the movement distance or stroke of both seal portions upon the change-over becomes short, and therefore the change-over can be carried out more rapidly. Further, since the piston member is provided between the first and second valve body forming members, the first and second seal portions can be moved stably between two valve seats with wash fluid being fed from the pump body, and therefore the change-over of the delivery pipes can be carried out more completely.

Furthermore, in the washer pump of the present invention regarding another embodiment, advantageous effects obtained are as follows: Since the valve body is provided with elastically-deforming portions, the seal portions can be moved with little resistance between two valve seats and with the effective pressure areas of the seal portions being kept constant, and therefore the changing force and the sealing force can be increased. As a result, even though high viscous wash fluid is used, the washer pump is actuated at low temperatures, or the voltage in the battery has dropped, any leakage of wash fluid from the delivery pipe to be closed does not occur, and the change-over of the delivery pipes can be accomplished rapidly and completely. In addition, even though the seal portion of the valve body has attached to the valve seat provided on the end portion of the delivery pipe, the pressure of wash fluid fed from the pump body through the conduction pipe acts on the valve body to prevent the changing force from becoming very small. Accordingly, it is possible to prevent the seal portion of the valve body from keeping the wash fluid passage closed at the valve seat on the low pressure side. Further, the seal portions of the valve body can be arranged or located between two valve seats readily. Furthermore, since the valve body is provided with elastically-deforming portions preformed, it is not necessary to form the elastically-deforming portions manually, and therefore man-hour for assembling can be reduced, and further the maintenance of the valve mechanism can be carried out readily.

Furthermore, in the washer pump of the present invention regarding another embodiment, advantageous effects obtained are as follows: like the washer pump above-mentioned, the changing force and the sealing force are increased, and therefore the change-over of the delivery pipes can be performed rapidly and completely. In addition, since the valve body with the first and second seal portions, when wash fluid is not fed from the pump body, is always situated or kept approximately at the neutral position between two valve seats, the movement distance or stroke of both seal portions upon the change-over becomes short, and therefore the change-over can be carried out more rapidly. Further, since the piston member is provided between the first and second valve body forming members, the first and second seal portions can be moved stably between two valve seats, and therefore the change-over of the delivery pipes can be carried out more completely.

Furthermore, in the washer pump of the present invention regarding still another two embodiments, advantageous effects obtained are as follows: In the one embodiment, upon assembling, after the respective thick portions of two valve body forming members are connected to both concave portions of the piston member, the air existing within the communicating passage of the piston member is evacuated through the first air vent hole, whereby the respective thick portions are firmly fixed in both concave portions of the piston member respectively. In the other embodiment, upon assembling, after the respective thick portions of two valve body forming members are connected to both concave portions of the piston member and the respective annular projections of two valve body forming members are fitted between the valve cases and the valve body holder, the air existing within the communicating passage of the piston member is evacuated through the respective air vent holes of the piston member and the valve body holder and, at the same time, the air existing between two valve body forming members is evacuated through the second air vent hole of the valve body holder, whereby the respective thick portions of two valve body forming members are firmly fixed to both concave portions of the piston member and the respective annular projections of two valve body forming members are firmly fixed between the valve cases and the valve body holder.

It should also be understood that the foregoing relates to only a preferred embodiment of the invention, and that it is intended to cover all changes and modifications of the example of the invention herein chosen for the purpose of the disclosure, which do not constitute departures from the spirit and scope of the invention.

What is claimed is:

1. A washer pump comprising:
   a pump body having two wash fluid feed pipes and feeding wash fluid through said two feed pipes with difference in pressure therebetween; and
   a valve mechanism having two wash fluid conduction pipes communicating with said two feed pipes, two wash fluid delivery pipes delivering wash fluid, two valve seats located between said two conduction pipes and said two delivery pipes respectively and facing each other, and a valve body movable between said two valve seats and having two seal portions engageable with said two valve seats respectively, wherein one wash fluid passage is closed at one of said two valve seats on the low pressure side of said two feed pipes while the other wash fluid passage is opened at the other of said two valve seats on the high pressure side of said two feed pipes;

wherein said valve body of said valve mechanism has two generally deep dish-shaped diaphragms including bottoms, and said bottoms are pushed in an axial direction to be connected to each other through a piston member, so that one of said bottoms acts as the other side seal portion engageable with the other of said two valve seats.

2. A washer pump as defined in claim 1, wherein said valve mechanism includes a first valve case having one of said two conduction pipes and one of said two valve seats, a second valve case having the other of said two conduction pipes and the other of said two valve seats, and a valve body holder holding said valve body, and further said first and second valve cases are provided with a first valve case side engaging portion engaging one side of said valve body holder and a second valve case side engaging portion engaging the other side of said valve body holder with said first and second valve case side engaging portions facing each other and said seal portions of said valve body being located between said two valve seats.

3. A washer pump as defined in claim 2, wherein said piston member has two diaphragms connecting portions formed on both ends thereof and connected to each of said bottoms of said two diaphragms, a communicating passage extending between said two diaphragm connecting portions respectively, and a first air vent hole extending radially from said communicating passage to an outer surface thereof, and said valve body holder has two diaphragm mounting portions formed on both sides thereof and mounting each of peripheries of said two diaphragms, and a second air vent hole passing through radially.

4. A washer pump as defined in claim 2, wherein said pump body has a body case having said two feed pipes integrally formed therein, with said two feed pipes being provided with feed pipe side engaging portions respectively, and said conduction pipes of said first and second valve cases are provided with conduction pipe side engaging portions engaging said feed pipe side engaging portions respectively so that said feed pipe side engaging portions and said conduction pipe side engaging portions are engaged each other and said two feed pipes are connected to said two conduction pipes respectively.

5. A washer pump as defined in claim 2, wherein said pump body has a body case having said two feed pipes integrally formed therein, and said two feed pipes are respectively connected to said two conduction pipe through a tube.

6. A washer pump as defined in claim 1, wherein said valve seats are provided on end portions of said two conduction pipes respectively.

7. A washer pump as defined in claim 1, wherein said valve seats are provided on end portions of said two delivery pipes respectively.

8. A washer pump comprising:
a pump body having a motor including an output shaft and reversibly rotatable, an impeller firmly connected to said output shaft, and first and second wash fluid feed pipes communicating with a pump chamber enclosing said impeller;

first and second valve cases having first and second wash fluid conduction pipes respectively connected to said first and second feed pipes and located so as to face each other, first and second wash fluid delivery pipes respectively juxtaposed to said first and second conduction pipes and located so as to face each other, and first and second valve seats integrally formed on said first and second conduction pipes; and a valve mechanism having a valve body holder annularly shaped and arranged between said first and second valve cases, and a valve body consisting of an annular projection fitted between at least one of said first and second valve cases and said valve body holder, an elastically-deforming portion extended from said annular projection, and a pair of seal portions extended from said elastically-deforming portion and arranged so as to respectively oppose said first and second valve seats;

wherein said valve body of said valve mechanism has a first annular projection fitted between said first valve case and said valve body holder, a first valve body forming member including a first seal portion capable of coming in contact with and departing from said first valve seat formed on said first conduction pipe, a second annular projection fitted between said second valve case and said valve body holder, a second valve body forming member including a second seal portion capable of coming in contact with and departing from said second valve seat formed on said second conduction pipe, with said first and second valve body forming members being provided with first and second convex thick portions formed on opposite side surfaces with respect to said first and second seal portions, and a piston member including a first concave portion fitted to said first thick portion and a second concave portion fitted to said second thick portion, with said first and second concave portions being provided on both sides of said piston member.

9. A washer pump comprising:
a pump body having a motor including an output shaft and reversibly rotatable, an impeller firmly connected to said output shaft, and first and second wash fluid feed pipes communicating with a pump chamber enclosing said impeller;

first and second valve cases having first and second wash fluid conduction pipes respectively connected to said first and second feed pipes and located so as to face each other, first and second wash fluid delivery pipes respectively juxtaposed to said first and second conduction pipes and located so as to face each other, and first and second valve seats integrally formed on said first and second delivery pipes; and a valve mechanism having a valve body holder annularly shaped and arranged between said first and second valve cases, and a valve body consisting of an annular projection fitted between at least one of said first and second valve cases and said valve body holder, an elastically-deforming portion extended from said annular projection, and a pair of seal portions extended from said elastically-deforming portion and arranged so as to respectively oppose said first and second valve seats;

wherein said valve body of said valve mechanism has a first annular projection fitted between said first valve case and said valve body holder, a first valve body forming member including a first seal portion capable of coming in contact with and departing from said first valve seat formed on said first delivery pipe, a second annular projection fitted between said second valve case and said valve body holder, a second valve body forming member including a second seal portion capable of coming in contact with and departing from said second valve seat formed on said second delivery pipe, with said first and second valve body forming members being provided with first and second convex thick portions respectively formed on opposite side surfaces with respect to said first and second seal portions, and a piston member including a first concave portion fitted to said first thick portion and a second concave portion fitted to said second thick portion, with said first and second concave portions being provided on both sides of said piston member.

10. A washer pump as defined in claim 9, wherein said piston member is provided with a communicating passage passing between said first and second concave portions and of a diameter smaller than that of said first and second concave portions, and a first air vent hole communicating with said communicating passage.

11. A washer pump as defined in claim 10, wherein said valve body holder is provided with a second air vent hole communicating with said first air vent hole of said piston member.

12. A washer pump as defined in claim 8, wherein said piston member is provided with a communicating passage passing between said first and second concave portions and of a diameter smaller than that of said first and second concave portions, and a first air vent hole communicating with said communicating passage.

13. A washer pump as defined in claim 12, wherein said valve body holder is provided with a second air vent hole communicating with said first air vent hole of said piston member.

* * * * *